(12) United States Patent
Yoon et al.

(10) Patent No.: US 8,889,274 B2
(45) Date of Patent: *Nov. 18, 2014

(54) PERPENDICULAR MAGNETIC RECORDING LAYER WITH REGIONS HAVING DIFFERENT MAGNETIC ANISOTROPY CONSTANTS

(71) Applicant: Seagate Technology International, Cupertino, CA (US)

(72) Inventors: Seong-yong Yoon, Suwon-si (KR); Chee-kheng Lim, Yongin-si (KR); Hoo-san Lee, Osan-si (KR); Hoon-sang Oh, Seongnam-si (KR); Sok-hyun Kong, Seoul (KR)

(73) Assignee: Seagate Technology International, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,543

(22) Filed: Jan. 28, 2013

(65) Prior Publication Data

US 2013/0143073 A1 Jun. 6, 2013

Related U.S. Application Data

(63) Continuation of application No. 12/018,270, filed on Jan. 23, 2008, now Pat. No. 8,361,641.

(30) Foreign Application Priority Data

May 30, 2007 (KR) .......................... 10-2007-0052915

(51) Int. Cl.
*G11B 5/66* (2006.01)
*G11B 5/73* (2006.01)
*G11B 5/667* (2006.01)
*G11B 5/65* (2006.01)
*G11B 5/64* (2006.01)
*G11B 5/84* (2006.01)

(52) U.S. Cl.
CPC .............. *G11B 5/667* (2013.01); *G11B 5/7325* (2013.01); *G11B 5/65* (2013.01); *G11B 5/64* (2013.01); *G11B 5/84* (2013.01)
USPC ....................................................... 428/826

(58) Field of Classification Search
USPC .................... 250/492.3; 148/239; 427/533
See application file for complete search history.

(56) References Cited

U.S. PATENT DOCUMENTS

2003/0236646 A1   12/2003  Suzuki
2004/0013910 A1   1/2004   Acharya et al.
(Continued)

FOREIGN PATENT DOCUMENTS

JP   04155618 A   5/1992
JP   05205257 A   8/1993
(Continued)

OTHER PUBLICATIONS

English machine translation of JP 2004-272982, Japan, Sep. 2004.*

*Primary Examiner* — Holly Rickman
(74) *Attorney, Agent, or Firm* — Hall Estill Attorneys at Law

(57) ABSTRACT

An apparatus having a recording layer of a magnetic material with a concentration of implanted ions that increases in relation to a thickness direction of the recording layer to provide the recording layer with a continuously varied perpendicular magnetic anisotropy constant.

20 Claims, 4 Drawing Sheets

(56) References Cited

U.S. PATENT DOCUMENTS

| | | |
|---|---|---|
| 2004/0091748 A1 | 5/2004 | Kamata et al. |
| 2006/0147759 A1 | 7/2006 | Lee et al. |
| 2006/0204791 A1 | 9/2006 | Sakawaki et al. |
| 2006/0222901 A1 | 10/2006 | Inamura et al. |
| 2006/0222905 A1 | 10/2006 | Yasui et al. |
| 2007/0026262 A1 | 2/2007 | Maeda |
| 2007/0231609 A1 | 10/2007 | Ajan et al. |
| 2007/0292720 A1 | 12/2007 | Suess |

FOREIGN PATENT DOCUMENTS

| | | |
|---|---|---|
| JP | 2003-059024 | 2/2003 |
| JP | 2004272982 A | 9/2004 |
| KR | 1020020087362 A | 11/2002 |
| KR | 10-2004-0025430 A | 3/2004 |
| KR | 1020040033492 A | 4/2004 |

* cited by examiner

PERPENDICULAR MAGNETIC RECORDING LAYER WITH REGIONS HAVING DIFFERENT MAGNETIC ANISOTROPY CONSTANTS

RELATED APPLICATION

The present application is a continuation of copending U.S. patent application Ser. No. 12/018,270 filed on Jan. 23, 2008, which issues on Jan. 29, 2013 as U.S. Pat. No. 8,361,641 and which claims the benefit of Korean Patent Application No. 10-2007-0052915 filed May 30, 2007.

BACKGROUND

1. Field of the Disclosure

Various embodiments disclosed herein are generally directed to a perpendicular magnetic recording medium including a recording layer having a plurality of regions with different magnetic anisotropy constants and a method of manufacturing the perpendicular magnetic recording medium.

2. Description of the Related Art

Magnetic recording methods may be classified into perpendicular and longitudinal magnetic recording methods. In the longitudinal magnetic recording method, information is recorded by using a characteristic that a magnetization direction of a magnetic layer is aligned in parallel with a surface of the magnetic layer. In the perpendicular magnetic recording method, information is recorded by using a characteristic that a magnetization direction of a magnetic layer is aligned perpendicularly to the surface of the magnetic layer. Regarding the recording density, the perpendicular magnetic recording method is more advantageous than the longitudinal magnetic recording method. Accordingly, in order to obtain high density in magnetic recording, the perpendicular magnetic recording medium has been continuously researched.

FIG. 1 illustrates a general structure of a conventional perpendicular magnetic recording medium. Referring to FIG. 1, the perpendicular magnetic recording medium includes a substrate 10, a soft-magnetic underlayer 12, an intermediate layer 14, and a recording layer 16. A magnetic field generated from a recording head (not shown) passes through the soft-magnetic underlayer 12 and returns to the recording head, thereby forming a magnetic path H. At this time, a perpendicular component of the magnetic field magnetizes magnetic domains of the recording layer 16 and records information.

On the other hand, in magnetic recording, the recording density is limited due to a superparamagnetic effect. That is, as the recording density increases, a grain size of the recording medium decreases. Accordingly, thermal stability decreases. When the thermal stability decreases below a predetermined threshold, magnetic moments may not be aligned in one direction due to thermal agitation. The threshold is represented as follows:

$$\frac{K_U V}{K_B T} > 40 \qquad \text{[Inequality 1]}$$

where, $K_U$ is a magnetic anisotropy constant, V is a grain volume, $K_B$ is the Boltzmann constant, and T is an absolute temperature.

Accordingly, in order to manage the increase of the recording density, the thermal stability that satisfies inequality 1 has to be maintained. In order to maintain the thermal stability, a magnetic recording medium with a large magnetic anisotropy constant $K_U$ has to be manufactured so as to have a high anisotropic energy even in a small grain size. When the anisotropic energy of the recording medium increases, the coercivity Hc of the recording medium necessarily increases. Accordingly, it is difficult that magnetization reversal occurs. Thus, writability becomes low. For example, in order to secure the stability of recorded data for ten years in recording of 1000 Gb/in$^2$, the required magnetic anisotropy constant $K_U$ is 1.997E7 erg/cc. However, it is difficult for a current recording head to record data in a magnetic recording medium having a large magnetic anisotropy constant $K_U$. In order to solve this problem, a method of depositing a magnetic thin film having a large magnetic anisotropy constant $K_U$, a magnetic thin film having a small magnetic anisotropy constant $K_U$, and an intermediate layer therebetween by changing the thickness of the intermediate layer has been tried. However, in this case, materials selectable for a recording layer are limited, and thus it is difficult to manufacture a magnetic recording medium by using the aforementioned method. That is, since it is impossible to form the same isolation regions in two different magnetic layers, transition noise increases. Accordingly, the signal to noise ratio (SNR) increases.

SUMMARY

Various embodiments disclosed herein are generally directed to an apparatus comprising a recording layer of a magnetic material with a concentration of implanted ions that increases in relation to a thickness direction of the recording layer to provide the recording layer with a continuously varied perpendicular magnetic anisotropy constant.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Hereinafter, a perpendicular magnetic recording medium and a method of manufacturing the same according to an exemplary embodiment of the present disclosure will be described in detail by explaining exemplary embodiments of the disclosure with reference to the attached drawings.

Figure 1:
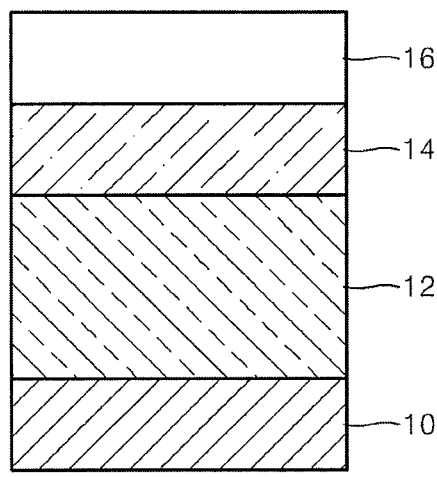
FIG. 1 illustrates a general structure of a conventional perpendicular magnetic recording medium.
Figure 2:
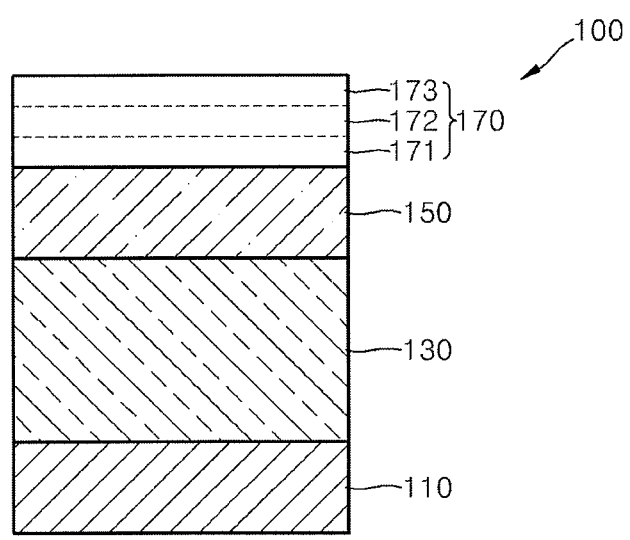
FIG. 2 illustrates a structure of a perpendicular magnetic recording medium according to an embodiment of the present disclosure.

FIG. 2 schematically illustrates a structure of a perpendicular magnetic recording medium 100 according to an embodiment of the present disclosure. Referring to FIG. 2, the perpendicular magnetic recording medium 100 includes a recording layer 170 having perpendicular magnetic anisotropy. The perpendicular magnetic recording medium 100 has a structure such that a soft-magnetic underlayer 130, an intermediate layer 150 and recording layer are sequentially formed on a substrate 110. A protection layer (not shown) protecting the recording layer 170 from the outside may be formed on the recording layer 170. A lubrication layer may be formed on the protection layer so as to reduce abrasion of the protection layer.

The substrate 110 may be made of glass, an Al—Mg alloy, magnesium oxide (MgO), silicon (Si), and the like.

The soft-magnetic underlayer 130 may be made of a soft magnetic material containing one or more materials selected from the group consisting of cobalt (Co), iron (Fe), and nickel (Ni).

The intermediate layer 150 is disposed between the recording layer 170 and the soft-magnetic underlayer 130 in order to improve the crystal orientation and magnetic properties of the recording layer 170. The intermediate layer 150 may be made of an alloy containing one or more materials selected from the group consisting of ruthenium (Ru), magnesium oxide (Mg), and nickel (Ni).

Information is recorded in the recording layer 170 through perpendicular magnetization. The recording layer 170 is constructed with a magnetic thin film or magnetic multi-layered thin films containing one or more materials selected from the group with high perpendicular magnetic anisotropy consisting of cobalt (Co), iron (Fe), platinum (Pt), and palladium (Pd). For example, the recording layer 170 may be made of a CoCrPtX-based material. For example, the recording layer 170 includes a first region 171 with a magnetic anisotropy constant $K_{U1}$, a second region 172 with a magnetic anisotropy constant $K_{U2}$, and a third region 173 with a magnetic anisotropy constant $K_{U3}$. A magnetic anisotropy constant of a relatively deeper region among the first to third regions 171 to 173 is greater than that of another region. That is, the magnetic anisotropy constants satisfies the condition $K_{U1}>K_{U2}>K_{U3}$. Here, the recording layer 170 constructed with the three regions is exemplified. However, the recording layer 170 may be constructed with one or more number (n) of regions that satisfy the condition that the magnetic anisotropy constant of the relatively deeper region is greater than that of another region. The size of each region is also exemplified. The size of each region can vary based on ion irradiation conditions. In addition, when N is sufficiently large, the magnetic anisotropy constant of the recording layer 170 has an increasing gradient with respect to the depth in the recording layer 170. The magnetic anisotropy constant $K_{U1}$ of the first region 171 that is the deepest region in the recording layer 170 has a value that secures thermal stability sufficient to obtain desirable recording density. Similarly, when the recording layer 170 has a gradient characteristic that the magnetic anisotropy constant increases as the depth in the recording layer 170 increases, the maximum value of the magnetic anisotropy constant has a value that secures thermal stability sufficient to obtain desirable recording density.

Table 1 shows magnetic anisotropy constants required to secure the stored data for ten years as the recording density increases.

TABLE 1

| Areal density (Gb/in$^2$) | Grain volume (nm$^3$) | Required $K_U$ (10$^7$ erg/cc) |
|---|---|---|
| 100 | 855 | 0.19 |
| 130 | 900 | 0.18 |
| 180 | 704 | 0.24 |
| 250 | 484 | 0.34 |
| 300 | 387 | 0.43 |
| 450 | 256 | 0.65 |
| 600 | 196 | 0.85 |
| 800 | 116 | 1.43 |
| 1000 | 83 | 1.99 |

Figure 3:
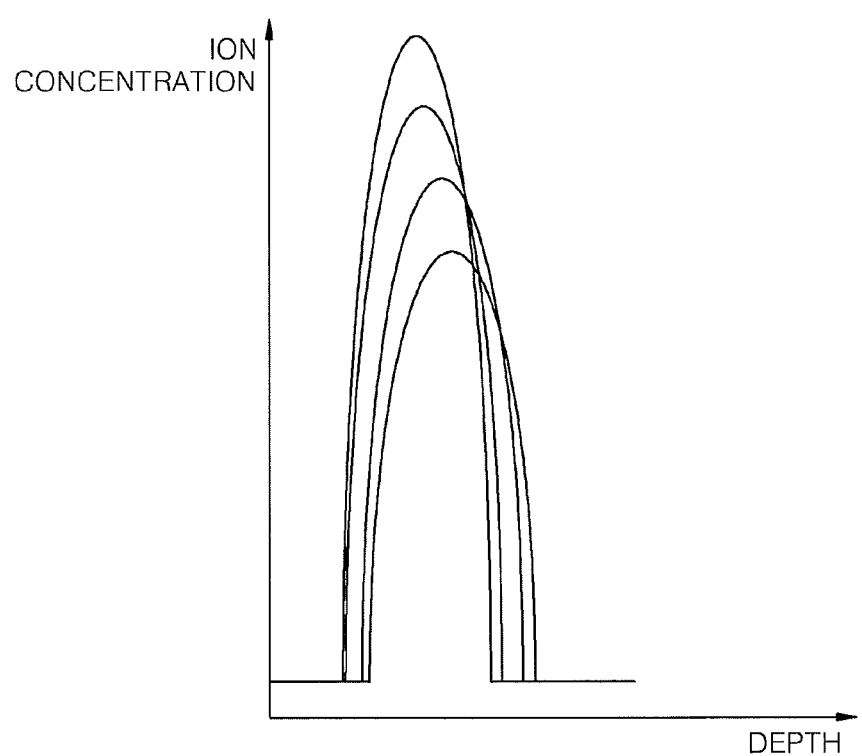
FIG. 3 is a graph illustrating examples of distribution of ion concentration for various ion irradiation conditions.

A method of forming the recording layer 170 having the aforementioned magnetic anisotropy constant is described hereinafter. The recording layer is made of a material with a sufficiently large magnetic anisotropy constant. For example, the recording layer 170 is formed so as to have a magnetic anisotropy constant $K_U$ corresponding to the desirable recording density. Then, the recording layer 170 is irradiated with ions. The ion irradiation is performed by using focused ion beam (FIB) equipment. The ions may be nitrogen (N) ions, helium (He) ions, and gallium (Ga) ions. The selection of ions, a dose of ions, energy, a scan method, and the like are controlled so as to obtain a desirable magnetic anisotropy constant $K_U$. FIG. 3 is a graph illustrating examples of distribution of ion concentration for various ion irradiation conditions. The magnetic anisotropy constant $K_U$ is largely decreased at a region with a high ion concentration. Therefore, the ion irradiation condition can be controlled so that the ion concentration is the highest in the surface side of the recording layer 170, for example, so as to satisfy the aforementioned condition $K_{U1}>K_{U2}>K_{U3}$. The ion irradiation condition can be controlled so that the value of the magnetic anisotropy constant $K_U$ may be continuously varied or so that two or more regions have different magnetic anisotropy constants $K_U$. For this, when irradiating the recording layer 170 with ions, the ion energy or dosed of ions may be constant or continuously varied, if necessary. In addition, an ion penetration depth is controlled by forming a stopping layer on the recording layer 170. The aforementioned processes may be simulated or performed experimentally. The ion irradiation condition is controlled so as to maintain the magnetic anisotropy direction and reduce the coercivity.

When irradiating the recording layer 170 with ions, the ions influence locations of atoms constituting the recording layer 170. Accordingly, a magnetic property of a ferromagnetic material, specifically, anisotropy or bonding strength is sensitively changed due to the rearrangement of the atoms. For example, when irradiating cobalt/platinum (Co/Pt) multi-layered films with gallium (Ga) ions, the magnetic property of the multi-layered films is changed. Specifically, when the ion energy is 30 keV and when the dose of ions is 5E12 ions/cc, the ion penetration depth ranges 6.8 nm to 9.2 nm. The magnetic anisotropy direction of the multi-layered films is maintained, and the coercivity is reduced.

Figure 4A:
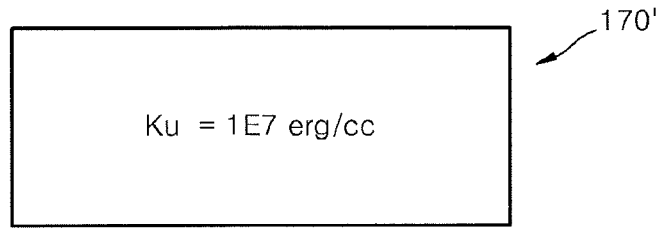
FIG. 4A to 4C are schematic diagrams illustrating a recording layer with magnetic anisotropy constants $K_U$ according to ion irradiation conditions.
Figure 4B:
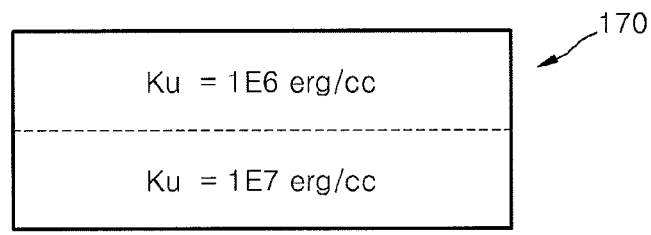
Figure 4C:
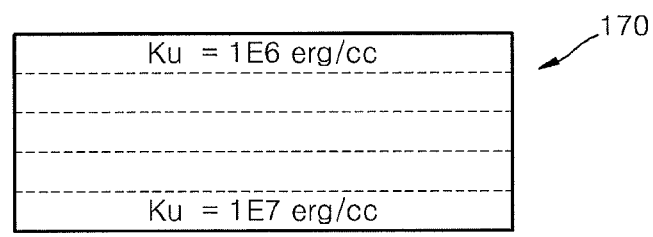

FIGS. 4A to 4C are schematic diagrams illustrating a recording layer with magnetic anisotropy constants $K_U$ according ion irradiation conditions. FIG. 4A shows a recording layer 170' constructed with a single region having a magnetic anisotropy constant $K_U$ of 1E7 erg/cc. The recording layer 170' has a conventional structure that is not irradiated with ions and a comparative example to compare with the present disclosure. FIGS. 4B and 4C respectively show recording layers constructed with two and five regions with different magnetic anisotropy constants $K_U$ which range from 1 E6 erg/cc to 1E7 erg/cc.

Figure 5:
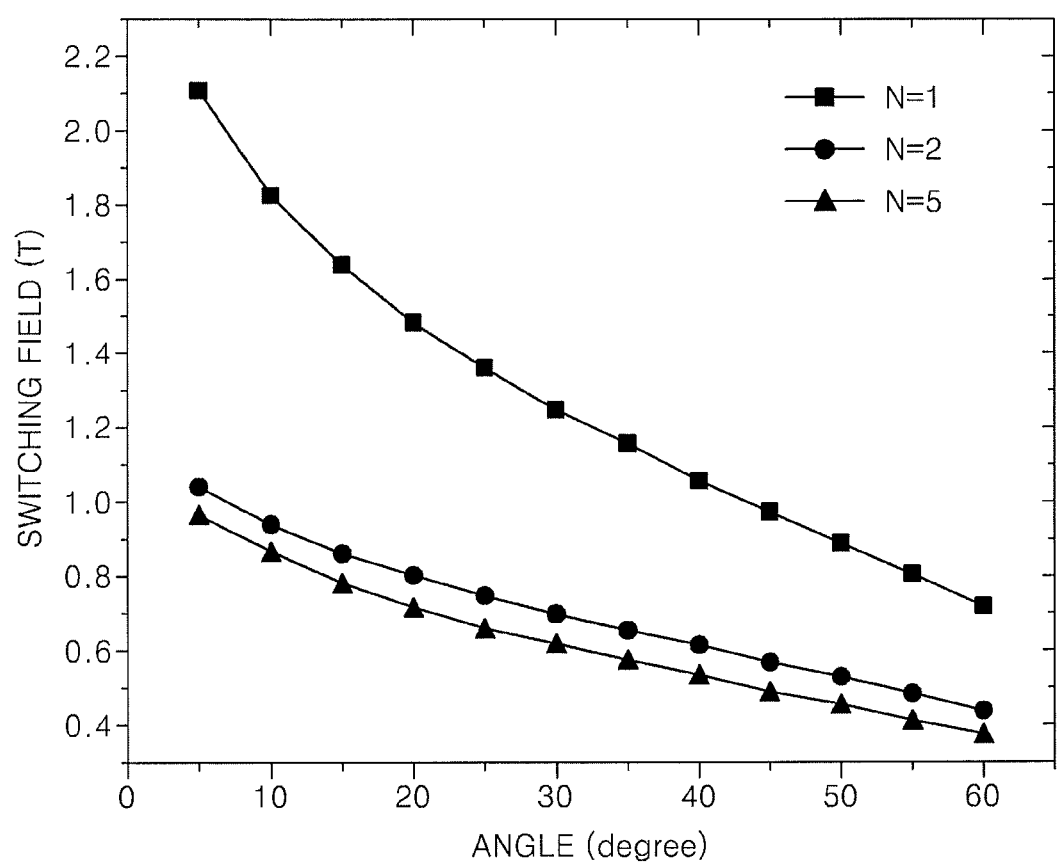
FIG. 5 is a graph illustrating a switching field according to an angle between an external magnetic field and a magnetization easy axis of grain in the perpendicular magnetic recording medium having the structures of FIGS. 4A to 4C.

FIG. 5 is a graph illustrating a switching field according to an angle between an external magnetic field and a magnetization easy axis of grain of the perpendicular magnetic recording medium having the structures of FIGS. 4A to 4C.

Referring to FIG. 5, the recording layer according to the present embodiment has a lower switching field than the conventional structure of FIG. 4A. Accordingly, writability is improved. In addition, the recording layer having five regions with different magnetic anisotropy constants has a lower switching field than the recording layer having two regions with different magnetic anisotropy constants.

As described above, in the perpendicular magnetic recording medium and the method of manufacturing the same, the recording layer includes a plurality of regions with different magnetic anisotropy constants or has a gradient in magnetic anisotropy constants by irradiating a recording layer having a high magnetic anisotropy constant with ions. Since the perpendicular magnetic recording medium including the recording layer has high thermal stability and writability, the perpendicular magnetic recording medium may be used as a high density perpendicular magnetic recording medium.

In addition, in the case of manufacturing the perpendicular magnetic recording medium with the aforementioned features by using the ion irradiation method, it is possible to solve a problem in that a recording characteristic is deteriorated when an interface is not neatly formed in a case where a recording layer is formed by using two different materials, that is, a material with a high magnetic anisotropy constant $K_U$ and a material with a low magnetic anisotropy constant $K_{U'}$.

While the perpendicular magnetic recording medium and the method of manufacturing the same according to an exemplary embodiment of the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An apparatus comprising:
   a substrate;
   a soft magnetic underlayer supported by the substrate;
   an intermediate layer supported by the soft magnetic underlayer; and
   a recording layer supported by the soft magnetic underlayer comprising a magnetic material with a concentration of implanted ions that increases in relation to a thickness direction of the recording layer to provide the recording layer with a continuously varied perpendicular magnetic anisotropy constant.

2. The apparatus of claim 1, in which the recording layer has a first perpendicular magnetic anisotropy constant $K_{U1}$ proximate an upper surface of the recording layer opposite the intermediate layer and a second perpendicular magnetic anisotropy constant $K_{U2}$ greater than $K_{U1}$ proximate a lower surface of the recording layer adjacent the intermediate layer.

3. The apparatus of claim 2, in which the perpendicular magnetic anisotropy constant of an intermediate region of the recording layer between the upper and lower surfaces continuously varies from $K_{U1}$ to $K_{U2}$.

4. The apparatus of claim 2, in which $K_{U2}$ is an order of magnitude greater than $K_{U1}$.

5. The apparatus of claim 1, in which the magnetic material of the recording layer comprises at least a selected one of cobalt (Co), iron (Fe), platinum (Pt) or palladium (Pd).

6. The apparatus of claim 5, in which the implanted ions comprise at least a selected one of nitrogen (N) ions, helium (He) ions or gallium (Ga) ions.

7. The apparatus of claim 1, in which the soft magnetic underlayer comprises at least a selected one of cobalt (Co), iron (Fe) or nickel (Ni).

8. The apparatus of claim 1, in which the intermediate layer comprises at least a selected one of ruthenium (Ru), magnesium oxide (MgO) or nickel (Ni).

9. The apparatus of claim 1, in which the continuously varied perpendicular magnetic anisotropy constant maintains thermal stability of the recording layer at a predetermined recording density.

10. An apparatus comprising a perpendicular magnetic recording layer of magnetic material with a concentration of implanted ions that increases in relation to a thickness direction of the recording layer to provide the recording layer with a continuously varied perpendicular magnetic anisotropy constant in relation to said thickness direction.

11. The apparatus of claim 10, further comprising a substrate, a soft magnetic underlayer supported by the substrate, an intermediate layer supported by the soft magnetic underlayer, wherein the intermediate layer supports the recording layer.

12. The apparatus of claim 10, in which the recording layer has a first perpendicular magnetic anisotropy constant $K_{U1}$ proximate an upper surface of the recording layer and a second perpendicular magnetic anisotropy constant $K_{U2}$ greater than $K_{U1}$ proximate a lower surface of the recording layer.

13. The apparatus of claim 12, in which the perpendicular magnetic anisotropy constant of an intermediate region of the recording layer between the upper and lower surfaces continuously varies from $K_{U1}$ to $K_{U2}$.

14. The apparatus of claim 12, in which $K_{U1}$ is an order of magnitude less than $K_{U2}$.

15. The apparatus of claim 10, in which the magnetic material of the recording layer comprises at least a selected one of cobalt (Co), iron (Fe), platinum (Pt) or palladium (Pd).

16. The apparatus of claim 15, in which the implanted ions comprise at least a selected one of nitrogen (N) ions, helium (He) ions or gallium (Ga) ions.

17. The apparatus of claim 10, in which the continuously varied perpendicular magnetic anisotropy constant maintains thermal stability of the recording layer at a predetermined recording density.

18. An apparatus comprising:
    a substrate;
    a soft magnetic underlayer supported by the substrate;
    an intermediate layer supported by the soft magnetic underlayer; and
    a recording layer supported by the soft magnetic underlayer comprising a magnetic material with a concentration of implanted ions that increases in relation to a thickness direction of the recording layer to provide at least four successive regions in the recording layer with different perpendicular magnetic anisotropy constants.

19. The apparatus of claim 18, in which the four successive regions are respectively characterized as first, second, third and fourth regions each having an associated perpendicular magnetic anisotropy constant $K_{U1}$, $K_{U2}$, $K_{U3}$ and $K_{U4}$, where the first region is proximate an upper surface of the recording layer opposite the intermediate layer and the fourth region is proximate a lower surface of the recording layer adjacent the intermediate layer, and $K_{U1} < K_{U2} < K_{U3} < K_{U4}$.

20. The apparatus of claim 18, in which the magnetic material of the recording layer comprises at least a selected one of cobalt (Co), iron (Fe), platinum (Pt) or palladium (Pd), and the implanted ions comprise at least a selected one of nitrogen (N) ions, helium (He) ions or gallium (Ga) ions.

* * * * *